US012523760B2

(12) United States Patent
Romano et al.

(10) Patent No.: US 12,523,760 B2
(45) Date of Patent: Jan. 13, 2026

(54) LOCALIZING AN RFID TAG IN A MONITORED ZONE

(71) Applicant: OMRON Corporation, Kyoto (JP)

(72) Inventors: Enzo Romano, Turin (IT); Gianmarco Grange, Turin (IT); Paolo Viviani, Turin (IT); Maurizio Cambursano, Turin (IT)

(73) Assignee: OMRON CORPORATION, Kyoto (JP)

(*) Notice: Subject to any disclaimer, the term of this patent is extended or adjusted under 35 U.S.C. 154(b) by 381 days.

(21) Appl. No.: 18/348,823

(22) Filed: Jul. 7, 2023

(65) Prior Publication Data

US 2024/0036190 A1    Feb. 1, 2024

(30) Foreign Application Priority Data

Jul. 29, 2022 (EP) .................................... 22187913

(51) Int. Cl.
*G01S 13/87* (2006.01)
(52) U.S. Cl.
CPC .................................. *G01S 13/878* (2013.01)
(58) Field of Classification Search
CPC ........ G01S 13/878; G01S 5/12; G01S 5/0278; G01S 3/74; G01S 13/46; G01S 13/75; G01S 2013/466
(Continued)

(56) References Cited

U.S. PATENT DOCUMENTS

| | | | |
|---|---|---|---|
| 5,119,104 A | 6/1992 | Heller | |
| 7,403,120 B2 * | 7/2008 | Duron | G01S 13/46 |
| | | | 700/214 |

(Continued)

FOREIGN PATENT DOCUMENTS

| | | |
|---|---|---|
| JP | 2001166828 A | 6/2001 |
| JP | 2012127906 A | 7/2012 |

(Continued)

OTHER PUBLICATIONS

JPO Notice of Reasons for Refusal for corresponding JP Application No. 2023-108195; Issued Mar. 12, 2024.

(Continued)

*Primary Examiner* — Bo Fan
(74) *Attorney, Agent, or Firm* — CANTOR COLBURN LLP

(57) ABSTRACT

A method for localizing an RFID tag in a monitored zone comprises: emitting a reference signal from a reference RFID tag at a predefined reference position within the monitored zone, the reference signal including reference information; at a plurality of receivers, receiving the reference signal as a plurality of received reference signals; calculating a position of the reference RFID tag as a function of the received reference signals; comparing the calculated position of the reference RFID tag with the predetermined reference position for obtaining a test result; emitting an operation signal from the RFID tag, the operation signal including operation information associated with the RFID tag; at the plurality of receivers, receiving the operation signal as a plurality of received operation signals, comparing the received operation information with predetermined validation information associated with the RFID tag for obtaining a validation result; as a function of the test result and/or validation result, calculating a position of the RFID tag based on/as a function of the received operation signals and/or generating a position signal indicative of the RFID tag position based on/as a function of the received operation signals.

15 Claims, 5 Drawing Sheets

(58) Field of Classification Search
USPC .... 342/463, 450, 458, 129, 442, 42, 357.01,
342/357.06, 357.48
See application file for complete search history.

(56) References Cited

U.S. PATENT DOCUMENTS

| | | | |
|---|---|---|---|
| 8,072,311 B2 * | 12/2011 | Sadr | G01S 5/12 340/539.22 |
| 2012/0154200 A1 | 6/2012 | Kajiki | |
| 2017/0195832 A1 | 7/2017 | Santiago et al. | |
| 2020/0106177 A1 | 4/2020 | Zhou et al. | |
| 2021/0232102 A1 | 7/2021 | Hammes et al. | |
| 2022/0066051 A1 | 3/2022 | Hirohata | |
| 2022/0109516 A1 | 4/2022 | Marshall et al. | |

FOREIGN PATENT DOCUMENTS

| | | | |
|---|---|---|---|
| JP | 2020527310 A | 9/2020 | |
| JP | 2022038880 A | 3/2022 | |

OTHER PUBLICATIONS

Notice of Reasons for Refusal for corresponding JP Application No. 2023-108195; Issued Jul. 9, 2024; 5 pages.
EPO Extended European Search Report for EP Application No. 22187913.3; Mailing Date, Apr. 26, 2023.

* cited by examiner

LOCALIZING AN RFID TAG IN A MONITORED ZONE

CROSS REFERENCES TO RELATED APPLICATIONS

The present invention claims priority under 35 U.S.C. § 119 to European Patent Application, 22187913.3, filed on Jul. 29, 2022, the entire contents of which being incorporated herein by reference.

BACKGROUND

The present invention relates to a method for localizing an RFID tag in a monitored zone and to a localization system for localizing an RFID tag in a monitored zone.

TECHNICAL FIELD

Technology based on radio frequency (RF) emissions may be used to increase the safety of monitored zones, for example zones inside industrial plants, in order that the monitored zone can be considered safe. A monitored zone may be considered "safe" if a position of a localization tag, in particular an RFID tag, may be known in a reliable way, in particular, according to established and accepted safety standards. The localization tag may be attached to an object or a person entering the monitored zone, so that the position of the object or a person can be communicated to the monitoring system. Such position may be, in particular, used as a feedback variable in defining safety related operations on potentially dangerous apparatuses, for example the machinery which are present in an industrial plant.

SUMMARY OF INVENTION

It is desirable that the position is known in real time. This is the case in so-called "Real-Time Localization System" (RTLS) solutions.

A main inconvenience of the above-described systems is that they are not intrinsically safe, i.e., that the safety functionality is not completely implemented within the RF system itself, other devices being required to achieve the desired level of security, in particular according to the required safety standards. An example of that is provided in US 2021/0232102 A1, where two diverse technologies mutually validate one another.

It is hence an object of the present invention to provide an improved method and system for localizing an RFID tag in a monitored zone, which may overcome such inconvenience.

According to a first aspect, a method for localizing an RFID tag in a monitored zone is provided. The method comprises: emitting a reference signal from a reference RFID tag at a predefined reference position within the monitored zone, the reference signal including reference information; at a plurality of receivers, receiving the reference signal as a plurality of received reference signals; calculating a position of the reference RFID tag as a function of the received reference signals; comparing the calculated position of the reference RFID tag with the predetermined reference position for obtaining a test result; emitting an operation signal from the RFID tag, the operation signal including operation information associated with the RFID tag; at the plurality of receivers, receiving the operation signal as a plurality of received operation signals; comparing the received operation information with predetermined validation information associated with the RFID tag for obtaining a validation result; as a function of the test result and/or validation result, calculating a position of the RFID tag based on/as a function of the received operation signals and/or generating a position signal indicative of the RFID tag position based on/as a function of the received operation signals.

According to a second aspect, a localization system for localizing an RFID tag in a monitored zone is provided. The localization system comprises: at least a reference RFID tag for emitting a reference signal, the reference signal including reference information; at least a RFID tag for emitting an operation signal including operation information associated with the RFID tag; a plurality of receivers for receiving the reference signal as a plurality of received reference signals and for receiving the operation signal as a plurality of received operation signals; a safety unit configured for: calculating a position of the reference RFID tag as a function of the received reference signals; comparing the calculated position of the reference RFID tag with the predetermined reference position for obtaining a test result; comparing the received operation information with predetermined validation information associated with the RFID tag for obtaining a validation result; as a function of the test result and/or validation result, calculating a position of the RFID tag based on/as a function of the received operation signals and/or generating a position signal indicative of the RFID tag position based on/as a function of the received operation signals.

As "monitored zone" is meant any area where it is necessary to localize an RFID tag. The localization may be required for security reasons. The monitored zone may be for example a working area inside a working plant, including one or more dangerous machines, either stationary or movable. The RFID tag may be provided on a person, for example on an operator operating and moving inside the monitored zone, or on an object, for example a vehicle or machine operating and moving inside the monitored zone. The RFID tag is to be localized inside the monitored zone by defining its coordinates with respect to a cartesian system. The cartesian system may be a spatial 3D system, requiring three coordinates to be defined to localize the RFID tag with respect there to, a plane 2D system, requiring two coordinates to be defined, or a 1D system, for example a horizontal or vertical track, requiring one coordinate to be defined.

The "receivers" are devices, for example antennas, which may be used to receive the radio signals emitted by the RFID tag. The plurality receivers may be provided in any number inside the monitored zone or close thereto. The number of receivers may be dependent on the dimension of the monitored zone, larger zones normally requiring a greater number or receivers. A large number of receivers may provide a desired level of redundancy.

The RFID tag and the reference RFID tag may be active or passive RFID tags. The RFID tag and the reference RFID may be active tags provided with one emitter and one memory chip. Alternatively, the RFID tag and the reference RFID tag are active RFID tags, each provided with two emitters, each emitter emitting at a respective frequency, and one memory chip. The reference RFID tag is to be positioned at a predefined reference position within the monitored zone. The predetermined reference position is to be compared with a calculated position of the reference RFID tag for obtaining a test result. The test result provides a measure of the ability of the method or system to calculate the predefined reference position. The validation result provides a measure of the ability of the method or system to extract operation information from the signal received from the RFID tag, the operation information having to be compliant with predetermined validation information associated with the RFID tag.

As "safety unit" it is meant any software or hardware unit, which may be configured to perform the steps specified with reference to the first or the second aspect of the invention. The safety unit may be, for example, a computer client or server provided at the monitored zone or close thereto. The safety unit may be alternatively provided remotely from the monitored zone. The safety unit may be connected to the receivers by any means of communication, which may be wired or not wired. According to embodiments of the present invention, the safety unit may be at least partially included in one or more of the receivers.

Depending on the test result and/or validation result, the position of the RFID tag may be calculated or not. If, for example, the test result indicates that the method or system can calculate the predefined reference position and the validation result indicates that the operation information is compliant with the predetermined validation information, then the position of the RFID tag is calculated based on or as a function of the received operation signals. The expression "based on or as a function of" means that the received operation signals may be anyhow treated as mathematical entities to calculate the coordinates of the RFID tag with respect to the coordinate system associated to the monitored zone. Alternatively, or in addition to the calculation of the position of the RFID tag, a position signal may be generated, indicative of the RFID tag position. The position signal may be used for example as input for a plurality of action being performed within the monitored zone. For example, the position signal may be used as input for operating one or more machine inside the monitored zone. If, for example, the test result and/or validation result identifies that the method or system cannot calculate the predefined reference position and/or the operation information are not compliant with the predetermined validation information, then the RFID tag is not calculated. Consequently, the system may be put in lockout state.

Advantageously, the invention provides a rated position of the RFID tag, in particular a rated position with respect to safety standards. This is provided with a system which is based on a single technology (RF). The system can be therefore considered intrinsically safe, i.e., it is compliant with security standards and does not require any another additional system to confirm such compliance.

According to an embodiment, the method according to the first aspect further comprises sequentially deactivating at least one receiver and calculating the position of reference RFID tag as a function of the reference information received by the remaining receiver(s).

The word "sequentially" may here be understood as "one after another". In particular, all the receivers are activated at a same first time. The position of the reference RFID tag is calculated as a function of the received reference signals and the calculated position of the reference RFID tag is compared with the predetermined reference position for obtaining a test result. Then, at a second time later than the first time, one receiver is deactivated, the position of the reference RFID tag is calculated again as a function of the received reference signals and the calculated position of the reference RFID tag is compared with the predetermined reference position, or with the reference position calculated at the first time, for obtaining a test result. This sequence of steps is repeated for all the receivers. Advantageously, this embodiment may identify if one or more receivers are not correctly functioning.

According to an embodiment, the test result is indicative of a position deviation between the calculated position of the reference RFID tag and the predetermined reference position and/or a previously calculated position. Comparing the calculated position of the reference RFID tag with the predetermined reference position may include determining if the position deviation is below a predefined threshold. The predetermined reference position is fixed and known, i.e., the coordinates of the predetermined reference position with reference to the cartesian associated with the monitored zone are known. A position deviation may be calculated as a distance between the predetermined reference position and the calculated position. Such difference may be compared with a predefined threshold for obtaining the test result.

According to an embodiment, the operation and/or validation information includes any of an encryption key, identification information, time stamp. The operation and/or validation may be encrypted. The encryption key may be a shared key or a cyclical list of keys. The test and/or validation results may be dependent on the comparison of the encryption key with validation keys. The identification information may include an ID code of the RFID tag. The test and/or validation results may be dependent on the comparison of the ID code with an expected ID code. The time stamp is an information, in particular an encoded information, identifying when a certain event occurred. The test and/or validation results may be dependent on the comparison of the time stamp with an expected time stamp.

According to an embodiment, the test and/or validation result is indicative of the compliance with a predefined communication standard. In particular, the validation result may indicate that the communication between the RFID tag and the receivers is compliant with safety standards, such as IEC 13849 for safety of machinery and/or IEC 61508-2, in particular according to Annex A, for the functional safety of electrical/electronic/programmable electronic safety-related systems.

According to an embodiment, the method according to the first aspect includes comparing the received operation information with predetermined validation information associated with the RFID tag at each receiver. According to the same or another embodiment, the method according to the first aspect includes calculating the position of the RFID tag or generating the position signal based on/as a function of the received operation signal at each receiver. According to such embodiments, each receiver may function independently from the others.

According to an embodiment, the method according to the first aspect includes executing an RTLS algorithm and determining a position with respect to a coordinate system in the monitored zone. The RTLS algorithm may be a multi-lateration algorithm.

In embodiments, calculating the position of the operation RFID tag is only executed if the test result and/or the validation result indicates a normal or validated state of the localization system, e.g., the RFID tag and/or the receivers. The test and validation result may be indicative of an irregularity, such as a displaced reference tag or a disturbing or an unwanted interference signal. A normal state represents a state of an undisturbed functioning of the devices.

In embodiments a safety signal is generated if the test and/or validation result is indicative for an irregularity, wherein the safety signal is implemented to place a machine associated with the monitored zone in a safe mode. The safe mode may involve deactivating parts or devices of the machine to render the monitored zone safe. In a safe mode, preferably, no hazardous events may occur.

According to an embodiment, the emitted reference signal has a first frequency and the method according to the first aspect further comprises contemporaneously emitting a combined reference signal at the first and at a second frequency; receiving the combined reference signal as a plurality of received combined reference signals; calculating a position of the reference RFID tag as a function of the received combined reference signals.

According to an embodiment, the emitted operation signal has a first frequency and the method according to the first aspect further comprises contemporaneously emitting a combined operation signal at the first and at a second frequency; receiving the operation signal as a plurality of received combined operation signals; comparing the received operation information with predetermined validation information associated with received combined operation signals for obtaining the validation result.

Embodiment where signals are emitted at two different frequencies provide further comparisons for obtaining the validation and test results.

According to embodiments of the method according to the first aspect, at least a subset of the steps of the method are performed periodically according to a period, in particular comprised between 100 and 500 ms. Preferably, the period is predetermined based on a safety requirement stipulated by a safety standard for monitoring the movement of a person or an object in a safety zone. The above or below mentioned safety standards may be pertinent. In particular the validation and test results may be updated periodically according to such period.

According to an embodiment, the localization system according to the second aspect comprises a wearable to be worn by an operator entering the monitored zone, the wearable including the RFID tag. The wearable may be, for example, a wristband or any other type of garment. The wearable may include sensors for providing further information about the operator, for example heart frequency sensors and/or stress sensor. Safety related action may be further conditioned by the information provided by such sensor. A warning may be for example provided if the stress level of the operator is above a predefine stress threshold. Sensors may be further used for recognizing the ID of the operator, to be for example compared with the access right. A warning may be for example provided if the operator has not a specific required authorization for entering the monitored zone. This would prevent that an unauthorized operator could borrow a RFID tag from an authorized operator.

It is understood that the localization system for localizing an RFID tag and/the devices comprised in the localization system are implemented to cooperatively carry out the method as disclosed and/or claimed.

According to a further aspect, the invention may relate to a computer program product comprising a program code for localizing an RFID tag in a monitored zone according to the first aspect when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention. It is understood that regulations, norms, or standards mentioned in this disclosure refer to the respective version at the time of filing this application or its priority date.

BRIEF DESCRIPTION OF THE DRAWINGS

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

DETAILED DESCRIPTION

Figure 1:
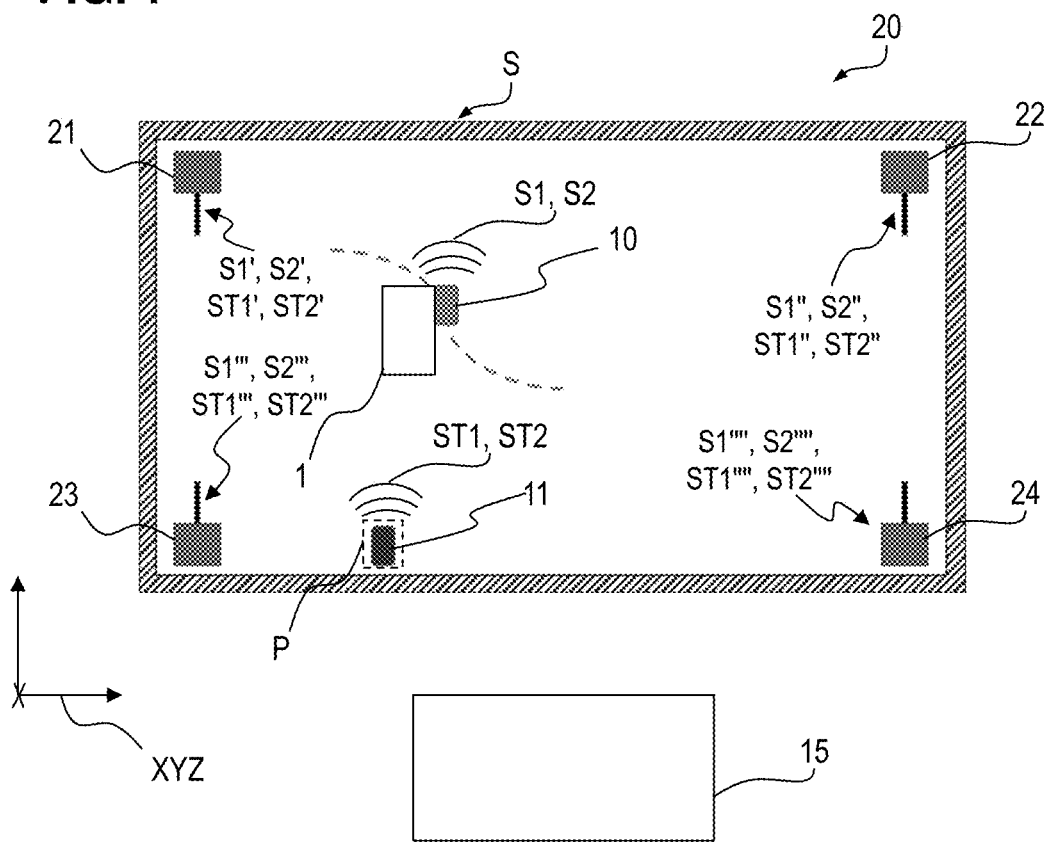
FIG. 1 Shows a monitored zone comprising a localization system according to a second aspect of the invention.
Figure 2:
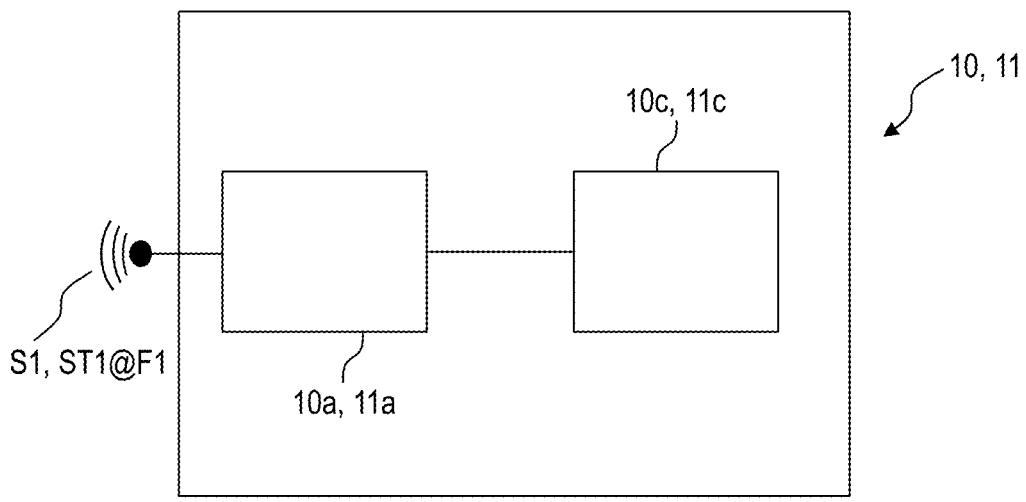
FIG. 2 Shows a first embodiment of an RFID tag according to the invention.
Figure 3:
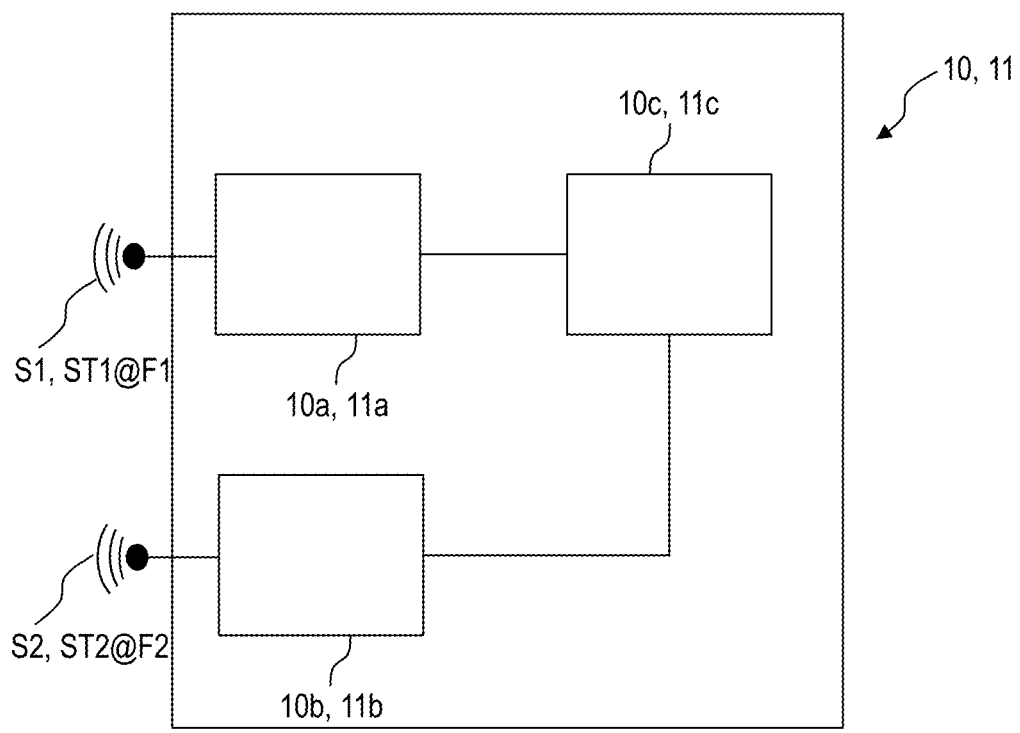
FIG. 3 Shows a second embodiment of an RFID tag according to the invention.

FIGS. 1 to FIG. 3 show a localization system 20 for localizing an RFID tag 10 in a monitored zone S. The monitored zone may be a working area inside a working plant, including one or more dangerous machines (not represented in FIG. 1, either stationary or movable). A cartesian system XYZ is associated to the monitored zone S, each point inside the monitored zone S being defined by three respective coordinates X, Y and Z of the cartesian system XYZ. In the representation of FIG. 1, the third coordinate Z of the cartesian system XYZ is oriented perpendicular to the plane of the figure and exiting it toward the observer. According to other embodiments of the invention (not shown), the cartesian system may be a plane 2D system, requiring two coordinates to be defined, or a 1D system, for example a horizontal or vertical track, requiring one coordinate to be defined.

The localization system 20 localizes S the RFID tag 10 inside the monitored zone by calculating the coordinates X, Y and Z of the RFID tag 10 with respect to the cartesian system XYZ, as better clarified in the following, according to predefined communication and safety standards.

The RFID tag 10 may be provided on a person, for example on an operator operating and moving inside the monitored zone S, or on an object, for example a vehicle or machine operating and moving inside the monitored zone S. The RFID tag 10 is an active RFID configured for emitting an operation signal S1, S2 at respective frequencies F1, F2, the operation signal including operation information associated with the RFID tag 10.

FIG. 2 shows a first embodiment of an active RFID tag 10 or of a reference RFID tag 11 according to a first embodiment of the invention. The active RFID tag 10 and the reference RFID tag 11 of the first embodiment include a respective emitter 10a, 11a and a respective memory chip 10c, 11c. The emitter 10a, 11a emits the operation signal S1 and the reference signal ST1 at a frequency F1, in the range from 3.1 to 10.6 MHz. The memory chip 10c, 11c includes identification information about the active RFID tag 10 and the reference RFID tag 11, respectively. FIG. 3 shows a second embodiment of an active RFID tag 10 or of a reference RFID tag 11 according to a second embodiment of the invention. The active RFID tag 10 and the reference RFID tag 11 of the second embodiment include a respective first emitter 10a, 11a, a respective second emitter 10a, 11a and a respective memory chip 10c, 11c. The first emitter 10a, 11a emits a first operation signal S1 and a first reference signal ST1 at a frequency F1, in the range from 3.1 to 10.6 MHz. The second emitter 10b, 11b emits a second operation signal S2 and a second reference signal ST2 at a frequency F2, in the range from 3.1 to 10.6 MHz. One may contemplate of ultra-wide band frequencies, as for example use as CEVARivieraWaves. The tags may comply with IEEE 802.15.4z HRP.

The localization system 20 further comprises a reference RFID tag 11. The RFID tag 11 is an active RFID configured for emitting a reference signal ST1, ST2 at respective frequencies F1, F2, the reference signal ST1, ST2 including reference information. The RFID tag 11 is subject to positioned on a predefined reference position P, the coordinates of the predefined reference position P with respect to the cartesian system XYZ being known.

The localization system 20 further comprises a plurality of receivers (four receivers 21, 22, 23, 24 in the embodiment of FIG. 1) for receiving the reference signal ST1, ST2 as a plurality of received reference signals ST1'-ST1'''', ST2'-ST2'''' and for receiving the operation signal S1, S2 as a plurality of received operation signals S1'-S1'''', S2'-S2''''. The plurality of receivers 21, 22, 23, 24 may be provided as a plurality of antennas capable of receiving the radio signals emitted by the RFID tags. According to the different embodiments of the invention, the plurality receivers may be provided in any number inside the monitored zone or close thereto. The signals ST1'-ST1'''', ST2'-ST2''''; S1'-S1'''', S2'-S2'''' received by the receivers 21, 22, 23, 24 are used to calculate the position of the RFID tags 10, 11 with respect to the cartesian system XYZ. Therefore, in case three coordinates have to be defined, like in the exemplary embodiment of FIG. 1, a minimum of three receiver is required. As some level of redundancy is desirable, preferred embodiments include four or more receivers.

The localization system 20 further comprises a safety unit 15. The safety unit may be, for example, a computer client or server provided at the monitored zone S or close thereto. According to other embodiments of the invention, the safety unit may be provided remotely from the monitored zone. The safety unit 15 connected to the receivers by any means of communication, which may be wired or not wired. According to embodiments of the present invention, the safety unit may be at least partially included in any of the receivers 21, 22, 23, 24.

Figure 4:
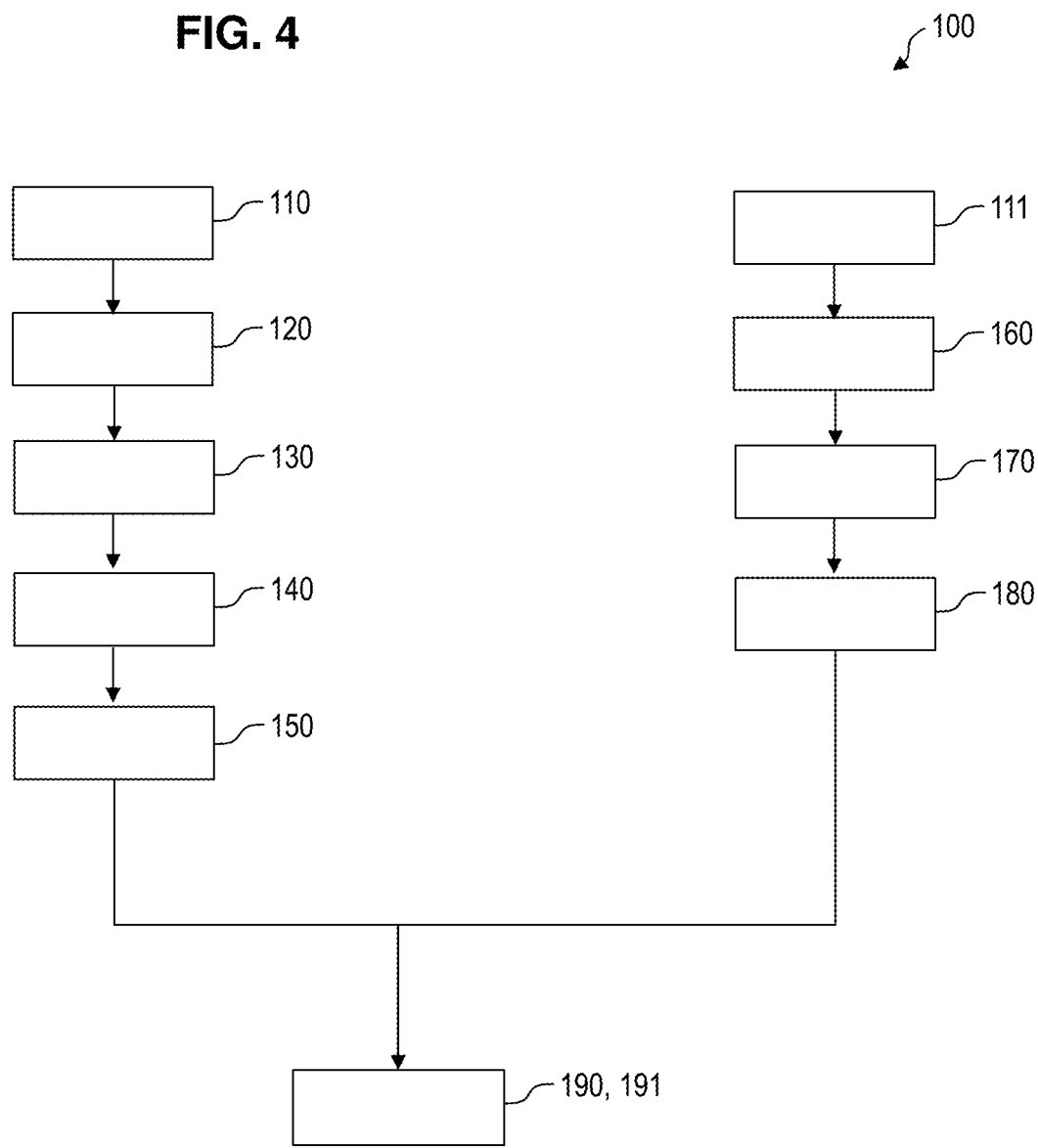
FIG. 4 Shows a block diagram of a method according to the first aspect of the invention.

The safety unit 15 is configured for executing a method 100 for localizing the RFID tag 10 in the monitored zone S, as shown in FIG. 4.

The method 100 includes a step 110, wherein the reference RFID tag 11 is positioned at a known reference position P within the monitored zone S, i.e. a position P, whose coordinates X, Y and Z with respect to the cartesian system XYZ are given.

In a step 120 of the method 100, the reference signal ST1 is emitted from the reference RFID tag 11. The reference signal ST1 includes reference information regarding the reference RFID tag 11. Reference information include an encryption key (or a cyclical list of keys) and/or an identification (ID) information and/or a time stamp. After the step 120, in a step 130 of the method 100, the reference signal ST1 is received at the plurality of receivers 21, 22, 23, 24 as a respective plurality of received reference signals ST1', ST1'', ST1''', ST1''''. After the step 130, in a step 140 of the method 100, the position of the reference RFID tag 11 is calculated as a function of the received reference signals ST1'-ST1''''. The position may be calculated by means of an RTLS algorithm, for example a multi-lateration algorithm. The position of the reference RFID tag 11 may be defined through three coordinates X1, Y1 and Z1 with respect to the cartesian system XYZ. After the step 140, in a step 150 of the method 100, the calculated position of the reference RFID tag 11 is compared with the predetermined reference position P and the received reference information is compared with predetermined reference information associated with the reference RFID tag for obtaining a test result. The test result may be indicative of a position deviation between the calculated position X1, Y1, Z1 of the reference RFID tag 11 and the predetermined reference position P. In an embodiment of the invention, the step 150 of the method 100 includes calculating a position deviation between the coordinates X1, Y1, Z1 of the calculated position and the coordinates X, Y, Z of the reference position P and determining if the position deviation is below a predefined threshold. The position deviation may be calculated as the geometric distance between the coordinates X1, Y1, Z1 and the coordinates X, Y, Z. The test result is therefore a measure of how precisely the known reference position P can be calculated based on or as a function of received reference signals ST1'-ST1''''. The predefined threshold determines the accepted precision of such calculation. If the test result is positive, it may be assumed that the localization system 20 and/or the method 100 can provide a reliable measure of the position of the RFID tag 10. The test result may be further dependent on a comparison between the received reference information and predetermined reference information associated with the reference RFID tag. The test result may be indicative of the compliance with a predefined communication standard. Reference information may be for example encrypted. Dynamic decryption of the reference information message ensures that the reference RFID tag 11 is correctly operational according to the predefined standard, for example IEC 13849 and/or IEC 61508-2. If the test result is positive, it may be assumed that the localization system 20 and/or the method 100 can communicate safely according to the predefined standard and/or the reference RFID tag 11 is correctly operational.

After the steps 120, 130, 140, 150 or parallel thereto, the method 100 comprises a step 111 of attaching the RFID tag 10 to a person or an object, before the person or object enters the monitored zone S, for example for performing one or more operations inside it. Step 111 may be performed by an operator entering the monitored zone S by wearing a wearable including the RFID tag 10. The wearable may be, for example, a wristband or any other type of garment.

Further safety devices (not shown in the attached figures) may be provided at the monitored zone S for detecting if a person or an object enters the monitored zone S. Such safety devices may be, for example, a light curtain, or optoelectronic sensors including laser scanners or light grids, or other similar. Such safety devices may be operated in connection with the receiver 21, 22, 23, 24 to detect if a person or object is entering the monitored zone S without a RFID tag attached thereto. In such a case a warning signal may be generated.

In a step 160 of the method 100, an operation signal S1 is emitted from the RFID tag 10, the operation signal S1 including operation information associated with the RFID tag 10. Operation information include an encryption key (or a cyclical list of keys) and/or an identification (ID) information and/or a time stamp. After the step 160, in a step 170 of the method 100, the operation signal S1 is received at the plurality of receivers 21, 22, 23, 24 as a respective plurality of received operation signals S1', S1'', S1''', S1''''. After the step 170, in a step 180 of the method 100, the received operation information is compared with predetermined validation information associated with the RFID tag 10 for obtaining a validation result. The validation result may be indicative of the compliance with a predefined communication standard. Operation information may be for example encrypted. Dynamic decryption of the reference information message ensures that the RFID tag 10 is correctly operational according to the predefined standard, for example IEC 13849 and/or IEC 61508-2. If the validation result is positive, it may be assumed that the localization system 20 and/or the method 100 can communicate safely according to the predefined standard and/or the RFID tag 10 is correctly operational.

The steps 160, 170, 180 of the method 100 may be performed after the steps 120, 130, 140, 150 or parallel thereto.

In a step 190 of the method 100, a position of the RFID tag 10 is calculated as a function of the test result and/or validation result. The position of the RFID tag 10 is not calculated if the test result or validation result provides the localization system 20 and/or the method 100 cannot provide a reliable measure of the position of the RFID tag 10 and/or that the localization system 20 and/or the method 100 are not compliant with the predefined communication standard. In such case a warning may be generated and/or the system may be put in a lockout state. The position of the RFID tag 10 is calculated based on or as a function of the received operation signals S1'-S1'''', for example by means of an RTLS algorithm, such as a multi-lateration algorithm. Alternatively, or in addition to the step 190, the method 100 may include a step 191 of generating a position signal 191 indicative of the position of the RFID tag 10 based on or as a function of the received operation signals S1'-S1''''. The position signal may be used for example as input for a plurality of action being performed within the monitored zone. For example, the position signal may be used as input for operating one or more machine inside the monitored zone.

At least a portion of the steps, or a subset, of the method 100, for example the sequence of steps 120, 130, 140, 150, 160, 170, 180, 190/191 may performed periodically according to a period comprised between 100 and 500 ms.

Figure 5:
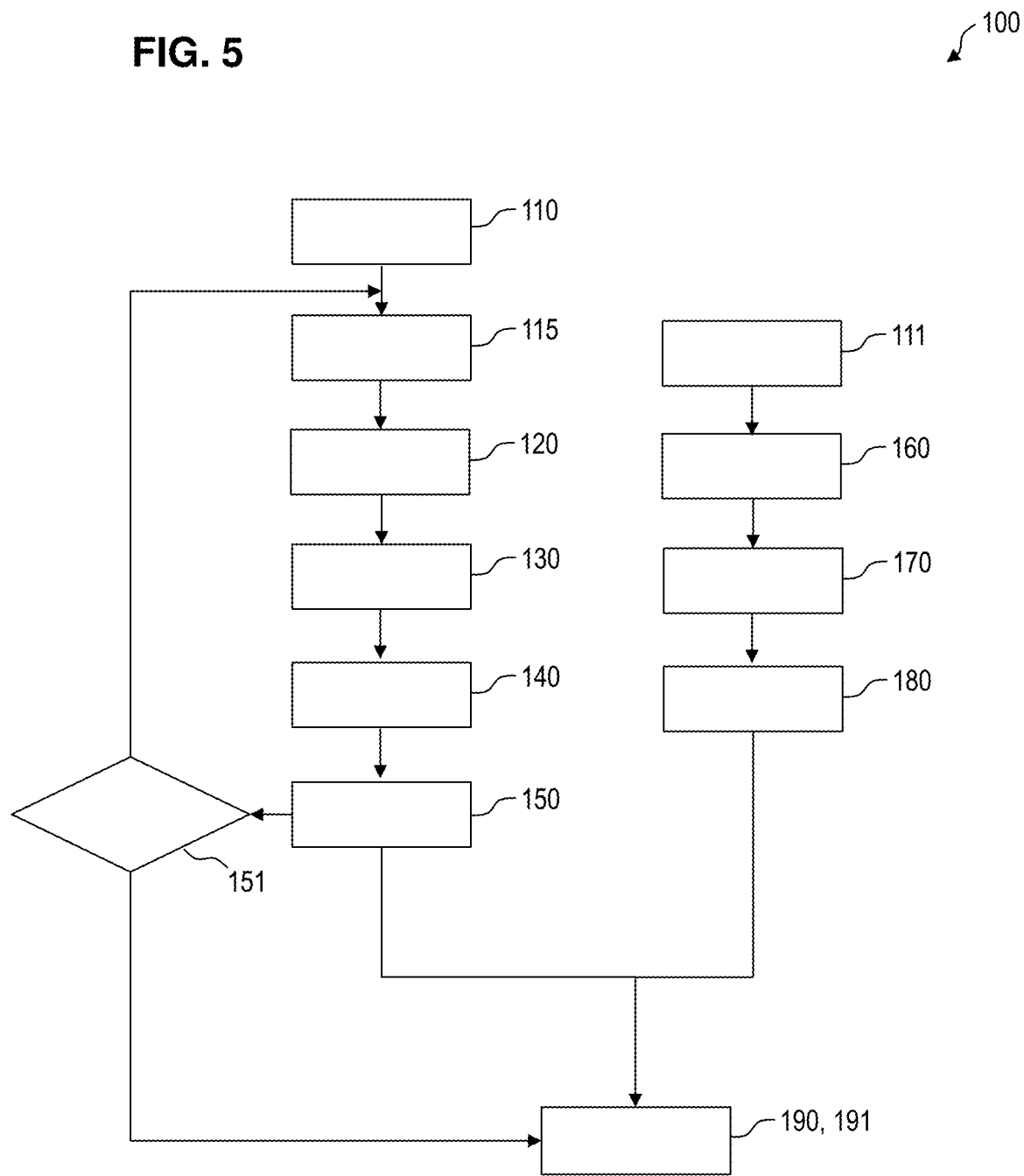
FIG. 5 Shows a first variant of the block diagram of FIG. 4.

FIG. 5 shows a first variant for the method 100 of FIG. 4. In the variant according to FIG. 5, the method 100 differentiates itself for including the step 115 of deactivating one receiver 21, 22, 23, 24, the step 140 including calculating the position of reference RFID tag 11 as a function of the reference information received by the remaining receiver(s) 21, 22, 23, 24. The deactivation of one receiver 21, 22, 23, 24 is performed iteratively and sequentially, at each iteration one of the receivers 21, 22, 23, 24 being deactivated. In the embodiment of the attached figures with four receivers 21, 22, 23, 24, the deactivation of one of the receivers 21, 22, 23, 24 is therefore performed four times. According to other embodiment of the invention, at each iteration a plurality of receivers is simultaneously deactivated.

According to the method of FIG. 5, after the execution of the step 150, a step 151 is performed for checking if all the receivers 21, 22, 23, 24 have been sequentially deactivated. If not all the receivers 21, 22, 23, 24 have been sequentially deactivated, the method continue with the step 115, wherein one receiver 21, 22, 23, 24 is deactivated. The steps 120, 130, 140 and 150 are then repeated with the other active receivers (three active receivers for the embodiment of the attached figures). After all the receivers 21, 22, 23, 24 have been sequentially deactivated, the iteration of the sequential deactivation of the receivers 21, 22, 23, 24 is terminated. At each execution of the step 150 the calculated position of the reference RFID tag 11 is updated and compared with the predetermined reference position P for obtaining the test result. Alternatively, at each execution of the step 150 the calculated position of the reference RFID tag 11 is updated and compared with the position calculated at the previous iteration. The iteration of the test result, each time with one deactivated receiver 21, 22, 23, 24, may indicate that one or more receivers are not correctly functioning.

Figure 6:
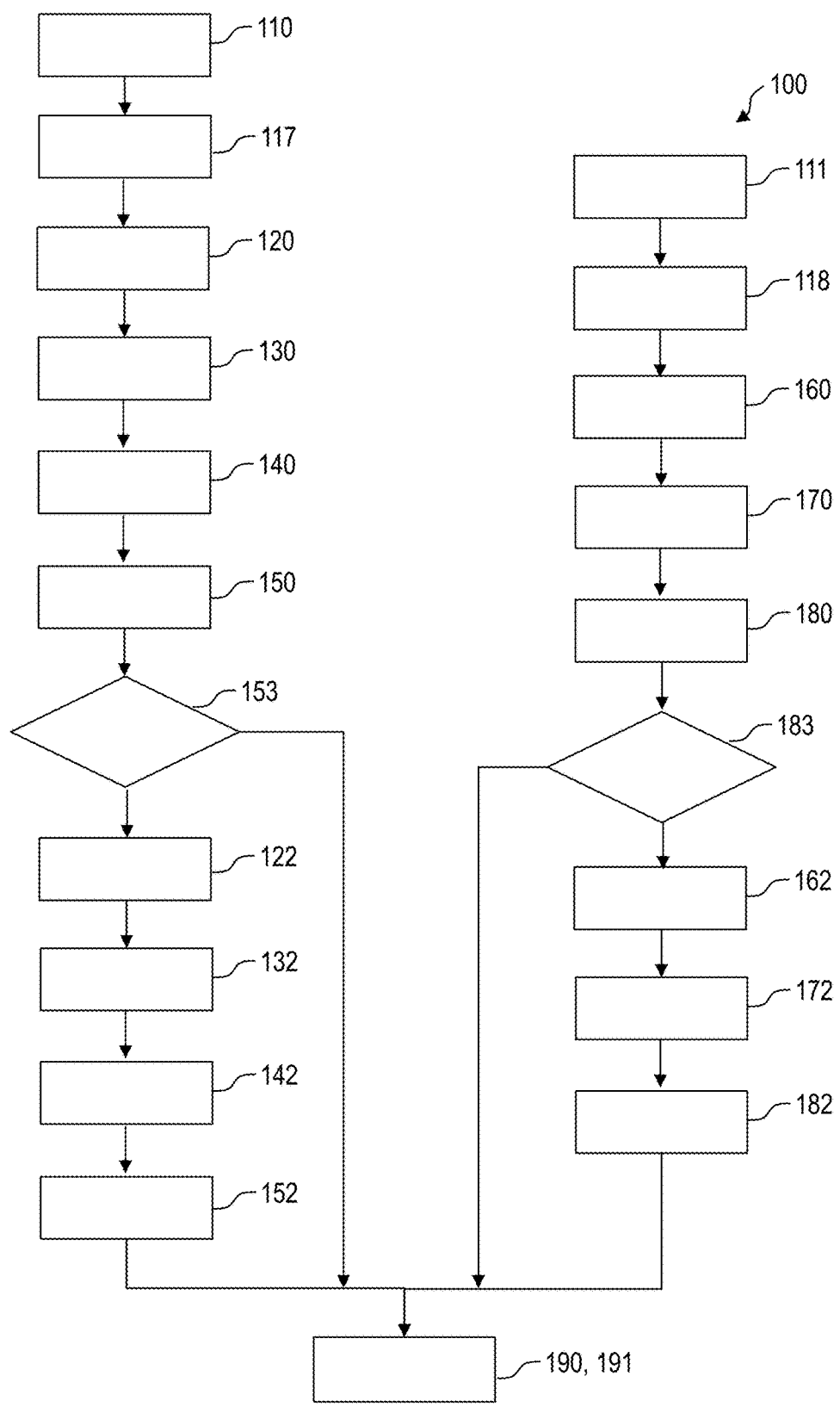
FIG. 6 Shows a second variant of the block diagram of FIG. 4.

FIG. 6 shows a second variant for the method 100 of FIG. 4. In the variant according to FIG. 6, the emitted reference signal ST1 and the emitted operation signal S1 have a first frequency F1, and the method further comprises: a step 122 of contemporaneously emitting a combined reference signal ST1, ST2 at the first frequency F1 and at a second frequency F2; a step 132 of receiving the combined reference signal ST1 as a plurality of received combined reference signals ST1'-ST1''''; ST2'-ST2''''; a step 142 of calculating a position of the reference RFID tag 11 as a function of the received combined reference signals ST1'-ST1''''; a step 162 of contemporaneously emitting a combined operation signal S1, S2 at the first and at a second frequency F1, F2; a step 172 of receiving the operation signal S1, S2 as a plurality of received combined operation signals S1'-S1''''; S2'-S2''''; a step 182 of comparing the received operation information with predetermined validation information associated with the received combined operation signals S1'-S1''''; S2'-S2'''' for obtaining the validation result.

The sequence of steps of the variant of FIG. 6 of the method 100 is detailed in the following. The RFID tag 10 and the reference RFID tag 11 are according to the embodiment of FIG. 3.

After the step 110, in a step 117 of the method 100, both the emitters 11a, 11b of the reference RFID tag 11 are deactivated and it is checked that consequently no signal is received by the receivers 21, 22, 23, 24. After that only the first emitter 11a is activated at the first frequency F1 for emitting the reference signal ST1.

After the step 117, the sequence of steps 120, 130, 140, 150 are performed as describe with reference to FIG. 4. After the step 150, a step 153 is performed for checking if the test result calculated at the previous step 150 has identified that the reference RFID tag 11 is correctly operational at the first frequency F1 for calculating the reference position P. If the check of the step 153 is positive, the sequence of the above describe steps 122, 132, 142 is performed. After the step 142, in a step 152 of the method 100, the position calculated in step 142 is compared with the predetermined reference position P for updating the test result. If the system is working correctly, it is expected the test results from both steps 150 and 152 are the same or similar.

After the steps 117, 120, 130, 140, 150, 153, 122, 132, 142, 152 or parallel thereto, the method 100 comprises the step 111 of attaching the RFID tag 10 to a person or an object, before the person or object enters the monitored zone S, for example for performing one or more operations inside it.

After the step 111, in a step 118 of the method 100, both the emitters 10a, 10b of reference RFID tag 10 are deactivated and it is checked that consequently no signal is received by the receivers 21, 22, 23, 24. After that only the first emitter 10a is activated at the first frequency F1 for emitting the operation signal S1.

After the step 118, the sequence of steps 160, 170, 170, 180 are performed as describe with reference to FIG. 4. After the step 180, a step 183 is performed for checking if the test result calculated at the previous step 180 has identified that the RFID tag 10 is correctly operational at the first frequency F1. If the check of the step 183 is positive, the sequence of the above describe steps 162, 172, 182 is performed. If the system is working correctly, it is expected the validation results from both steps 180 and 182 are the same or similar. When both the emitters 10a, 10b emit simultaneously a pulse wave is generated having a beat frequency (|F1-F2|), which is known from the theory, with given amplitude and phase. If such a wave does not correspond to the theoretic super-imposition of the signals emitted by the two emitters 10a, 10b a negative validation result is emitted at the step 182.

The steps 118, 160, 170, 180, 183, 162, 172, 182 may be performed after the steps 117, 120, 130, 140, 150, 153, 122, 132, 142, 152 or parallel thereto. For example, the sequence of steps 118, 160, 170, 180, 183, 162, 172, 182 may be executed only after that positive test results have been obtained in steps 150, 152.

After steps 152, 182, the steps 190, 191 are performed as describe with reference to FIG. 4.

Although the present invention has been described in accordance with preferred embodiments, it is obvious for the person skilled in the art that modifications are possible in all embodiments. It is understood that the presented technology is not limited to the mentioned figures and ranges, e.g., frequencies and/or periods.

REFERENCE NUMERALS

10 RFID tag
11 reference RFID tag
20 localization system
21, 22, 23, 24 receivers
100 method
110, 111, 115, 117, 118, 120, 130 method steps
132, 140, 142, 150, 151, 152, 153 method steps
160, 162, 170, 172, 180, 182, 183 method steps
190, 191 method steps
F1, F2 frequencies
S monitored zone
ST1, ST2 reference signals
ST1'-ST1''''; ST2'-ST2'''' received reference signals
S1, S2 operation signals
S1'-S1''''; S2'-S2'''' received operation signals
X, X1, Y, Y1, Z, Z1 coordinates
XYZ coordinate system

The invention claimed is:

1. A method for localizing an RFID tag in a monitored zone, the method comprising:
emitting a reference signal from a reference RFID tag at a predefined reference position within the monitored zone, the reference signal including reference information;
at a plurality of receivers receiving the reference signal as a plurality of received reference signals;
calculating a position of the reference RFID tag as a function of the received reference signals;
comparing the calculated position of the reference RFID tag with the predetermined reference position;
emitting an operation signal from the RFID tag, the operation signal including operation information associated with the RFID tag;
at the plurality of receivers receiving the operation signal as a plurality of received operation signals;
comparing the received operation information with predetermined validation information associated with the RFID tag for obtaining a validation result;
as a function of the test result and/or validation result, calculating a position of the RFID tag based on/as a function of the received operation signals and/or generating a position signal indicative of the position of the RFID tag based on/as a function of the received operation signals.

2. The method according to claim 1, wherein the method includes:
sequentially deactivating at least one receiver
calculating the position of reference RFID tag as a function of the reference information received by the remaining receiver(s).

3. The method according to claim 1, wherein the test result is indicative of a position deviation between the calculated position of the reference RFID tag and the predetermined reference position and/or a previously calculated position.

4. The method according to claim 3, wherein comparing the calculated position of the reference RFID tag with the predetermined reference position includes determining if the position deviation is below a predefined threshold.

5. The method according to claim 1, wherein the operation and/or reference information includes any of:
encryption key,
identification information,
time stamp.

6. The method according to claim 1, wherein the test and/or validation result is indicative of a compliance with a predefined communication standard.

7. The method according to claim 1, wherein comparing the received operation information with predetermined validation information associated with the RFID tag and/or calculating the position of the RFID tag or generating the position signal based on/as a function of the received operation signal is performed at each receiver.

8. The method according to claim 1, wherein the method includes comparing the received reference information with predetermined reference information associated with the reference RFID tag.

9. The method according to claim 1, wherein calculating the position of the operation RFID tag is blocked if the test result and/or validation result indicates an irregularity state of the RFID tag and/or the receivers; and/or a safety signal is generated if the test result and/or validation result indicates an irregularity state of the RFID tag and/or the receivers, wherein said safety signal is indicative of placing a machine associated with the monitored zone in a safe mode.

10. The method according to claim 1, wherein the emitted reference signal has a first frequency, the method further comprising contemporaneously emitting a combined reference signal at the first and at a second frequency; receiving the combined reference signal as a plurality of received combined reference signals calculating a position of the reference RFID tag as a function of the received combined reference signals.

11. The method according to claim 1, wherein the emitted operation signal has a first frequency, the method further comprising contemporaneously emitting a combined operation signal at the first and at a second frequency; receiving the combined operation signal as a plurality of received combined operation signals comparing the received operation information with predetermined validation information associated with the received combined operation signals for obtaining the validation result.

12. The method according to claim 1, wherein at least a subset of the steps of the method are performed periodically according to a predetermined period.

13. A localization system for localizing an RFID tag in a monitored zone, comprising:
  at least a reference RFID tag for emitting a reference signal, the reference signal including reference information;
  at least a RFID tag for emitting an operation signal including operation information associated with the RFID tag;
  a plurality of receivers for receiving the reference signal as a plurality of received reference signals and for receiving the operation signal as a plurality of received operation signals;
  a safety unit configured for:
    calculating a position of the reference RFID tag as a function of the received reference signals;
    comparing the calculated position of the reference RFID tag with the predetermined reference position for obtaining a test result;
    comparing the received operation information with predetermined validation information associated with the RFID tag for obtaining a validation result;
    as a function of the test result and/or validation result, calculating a position of the RFID tag based on/as a function of the received operation signals and/or generating a position signal indicative of the RFID tag position based on/as a function of the received operation signals.

14. The localization system according to claim 13, wherein the safety unit is at least partially comprised in any of the receivers.

15. The localization system according to claim 13, further comprising a wearable to be worn by an operator entering the monitored zone, the wearable including the RFID tag.

* * * * *